United States Patent
Schier et al.

(10) Patent No.: US 9,967,809 B2
(45) Date of Patent: May 8, 2018

(54) METHOD AND APPARATUS FOR MODIFIED REFERENCE SIGNAL TRANSMISSION FOR CELL DISCOVERY

(71) Applicants: ZTE Wistron Telecom AB, Kista (SE); ZTE (TX) INC., Austin, TX (US)

(72) Inventors: Thorsten Schier, Kista (SE); Patrick Svedman, Kista (SE); Aijun Cao, Kista (SE); Yonghong Gao, Kista (SE); Jan Johansson, Kista (SE); Bojidar Hadjiski, Kista (SE)

(73) Assignee: ZTE Wistron Telecom AB, Kista (SE)

( * ) Notice: Subject to any disclaimer, the term of this patent is extended or adjusted under 35 U.S.C. 154(b) by 91 days.

(21) Appl. No.: 15/024,337

(22) PCT Filed: Sep. 11, 2014

(86) PCT No.: PCT/US2014/055206
§ 371 (c)(1),
(2) Date: Mar. 23, 2016

(87) PCT Pub. No.: WO2015/047742
PCT Pub. Date: Apr. 2, 2015

(65) Prior Publication Data
US 2016/0242105 A1 Aug. 18, 2016

Related U.S. Application Data

(60) Provisional application No. 61/881,658, filed on Sep. 24, 2013.

(51) Int. Cl.
*H04W 48/16* (2009.01)
*H04W 48/12* (2009.01)
*H04L 5/00* (2006.01)

(52) U.S. Cl.
CPC .......... *H04W 48/16* (2013.01); *H04L 5/0048* (2013.01); *H04W 48/12* (2013.01)

(58) Field of Classification Search
CPC .... H04W 48/12; H04W 48/16; H04L 5/0048; H04L 5/005; H04L 5/0051
See application file for complete search history.

(56) References Cited

U.S. PATENT DOCUMENTS 8,483,149 B2 * 7/2013 Tiirola ................ H04L 5/0053
370/329
2011/0199944 A1 * 8/2011 Chen ..................... H04L 5/0007
370/280
(Continued)

FOREIGN PATENT DOCUMENTS

WO 2013/104425 A1 7/2013

OTHER PUBLICATIONS

International Search Report/Written Opinion dated Dec. 16, 2014, in corresponding International Application No. PCT/US2014/55206.

*Primary Examiner* — Jenee Holland
(74) *Attorney, Agent, or Firm* — Duane Morris LLP

(57) ABSTRACT

The proposed approach contemplates systems and methods configured to utilize a modified reference signal to facilitate efficient discovery of as many cells as possible within one channel state information reference signal (CSI-RS) subframe while maintaining certain detection and measurement performance. The proposed approach is configured to unambiguously discover at least the number of anticipated small cells within one cluster and to further identify all small cells within the coverage area of a base station/macro cell. In some embodiments, frequency multiplexing is utilized to allow different cells to transmit their discovery signals on (Continued)

different physical resource blocks (PRBs) rather than one cell using every PRB over the entire system bandwidth.

28 Claims, 5 Drawing Sheets

(56) References Cited

U.S. PATENT DOCUMENTS

| | | | | |
|---|---|---|---|---|
| 2011/0268028 | A1* | 11/2011 | Stern-Berkowitz | H04L 5/0048 370/328 |
| 2012/0021689 | A1* | 1/2012 | Han | H04W 76/023 455/63.1 |
| 2012/0106383 | A1 | 5/2012 | Gormley et al. | |
| 2012/0135741 | A1* | 5/2012 | Zhou | H04L 5/005 455/450 |
| 2012/0263145 | A1 | 10/2012 | Marinier et al. | |
| 2012/0300884 | A1* | 11/2012 | You | H04L 25/0204 375/340 |
| 2012/0314604 | A1 | 12/2012 | Siomina et al. | |
| 2013/0039386 | A1* | 2/2013 | Zhou | H04B 7/0691 375/135 |
| 2013/0044692 | A1 | 2/2013 | Nory et al. | |
| 2013/0084892 | A1* | 4/2013 | Teyeb | H04W 4/023 455/456.6 |
| 2013/0273912 | A1* | 10/2013 | Xu | H04W 24/08 455/434 |
| 2014/0003262 | A1* | 1/2014 | He | H04W 28/08 370/252 |
| 2014/0219162 | A1* | 8/2014 | Eyuboglu | H04W 16/26 370/315 |
| 2014/0219255 | A1* | 8/2014 | Eyuboglu | H04W 72/12 370/336 |
| 2014/0219267 | A1* | 8/2014 | Eyuboglu | H04W 56/001 370/350 |
| 2014/0247778 | A1* | 9/2014 | Gomadam | H04L 5/0094 370/329 |
| 2014/0307703 | A1* | 10/2014 | Gaal | H04L 5/0073 370/330 |
| 2015/0382205 | A1* | 12/2015 | Lee | H04B 7/0417 370/329 |
| 2016/0192385 | A1* | 6/2016 | Tooher | H04L 5/0051 370/336 |

* cited by examiner the small cell is not needed (e.g. when it has low or no load). During the idle period, it would be desirable to also switch off the PSS/SSS transmission. However, the UE will be unable to discover the presence of the cell when PSS/SSS is shut-off.

METHOD AND APPARATUS FOR MODIFIED REFERENCE SIGNAL TRANSMISSION FOR CELL DISCOVERY

RELATED PATENT APPLICATIONS

This application is a 371 National Phase Application from International Application No. PCT/US2014/055206, which was filed on Sep. 11, 2014 and claims benefit of priority under 35 U.S.C. § 119(e) to Provisional Application No. 61/881,658, entitled "APPARATUS AND METHOD FOR MODIFIED REFERENCE SIGNAL TRANSMISSION FOR CELL DISCOVERY," filed Sep. 24, 2013, which is incorporated by reference herein in its entirety.

FIELD OF THE INVENTION

The present invention relates generally to cellular telecommunication systems, especially to a heterogeneous network where multiple low-power nodes are deployed in a macro base station's coverage.

BACKGROUND OF THE INVENTION

Today's cellular communication systems provide not only voice services, but also mobile broadband services all over the world. As the number of applications for cell phones and other wireless devices continues to increase, and consume higher ever-increasing amounts of data, an enormous demand for mobile broadband data services is generated. This requires telecom operators to improve data throughput and maximize the efficient utilization of limited resources.

As the spectrum efficiency for the point-to-point link already approaches its theoretical limit, one way to increase data throughput is to split big cells into smaller and smaller cells. When the cells become closer to each other, however, interferences among adjacent cells become more severe, and the cell splitting gain saturates. Furthermore, it is becoming more difficult to acquire new sites to install base stations for the operators and the costs are also increasing. Therefore, cell-splitting alone cannot fulfill the demands.

Recently a new type of network deployment called Heterogeneous Network (HetNet) has been proposed and is attracting a lot of interest and effort by the industry. In HetNet, another tier of multiple low-power nodes (LPNs) is added as cells in the existing macro base station's coverage areas. The low power nodes may operate on the same carrier frequency as the macro node or on different carrier frequencies. For efficient network operations, it is desirable that the low power nodes/cells can be discovered by the user equipment (UE). The legacy solution to discover cells (e.g., LTE R8-R11) is to let the LTE base stations (eNBs) to transmit the primary synchronization signals (PSS) and secondary synchronization signals (SSS) every 5 ms. The UE searches for these PSS/SSS signals when it is looking for new cells. During the evolution of the $3^{rd}$ Generation Partnership Project (3GPP) standard it has been found that this legacy approach is not sufficient to deal with at least the following new challenges coming from the HetNet deployment:

a) The mutual interference between different PSS/SSS sequences from different cells is quite high. The PSS/SSS are not designed for dense deployment of cells as it now occurs in HetNets. Consequently, when many cells are present, the UE is only able to find a few of them.

b) In order to save power and to reduce interference, it is desirable to switch a small cell into an idle mode when

SUMMARY OF THE INVENTION

In one embodiment, the invention utilizes a modified reference signal in order to facilitate efficient discovery of small cells. In one embodiment, frequency multiplexing is utilized to allow different cells to transmit their discovery signals on different physical resource blocks (PRBs) rather than one cell using every PRB over the entire system bandwidth.

In accordance with one exemplary embodiment of the invention, a modified channel state information reference signal (CSI-RS) transmission and discovery technique used for efficient small cell discovery is described herein. As used herein, "efficient discovery" refers to finding as many cells as possible during one sub-frame and having as little impact as possible on legacy mechanisms.

It is understood that the invention is not limited to modified CSI-RS signals. Other signals such as Positioning Reference Signal (PRS), for example, might be modified in a similar manner. Even the design of entirely new signals for use in the LTE standard, for example, is contemplated within the scope of the present invention.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

Various embodiments are described and illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

The present invention is directed toward systems and methods for a cellular or mobile communication system. Embodiments of the invention are described herein in the context of an LTE network. The invention, however, is not limited to only LTE networks, and the methods described herein can also be utilized in other applications such as mobile-to-mobile communications, wireless local loop communications, wireless relay communications, or wireless backhaul communications, for non-limiting examples.

In order to solve the problems mentioned above, a special discovery signal based on the channel state information reference signals (CSI-RS) is investigated. CSI-RS was introduced in Release 10 (R10) for the purpose of link adaptation when an UE is using UE specific demodulation reference signal (DMRS) for demodulation instead of the cell specific reference signal (CRS). CSI-RS was further enhanced in Release 11 (R11).

As referred to hereinafter, a frame provides the main structure that governs how quickly a cell can acquire synchronization within a specified frame boundary and begin transmitting the CSI-RS. A frame is primarily characterized by a length, a presence of a synchronization signal, which typically carries known sequences located at a fixed predefined position in the frame, and control information that pertains to the frame. A frame can be further divided into several so-called sub-frames, which enables one frame to be shared among different users in the time domain.

Figure 1:
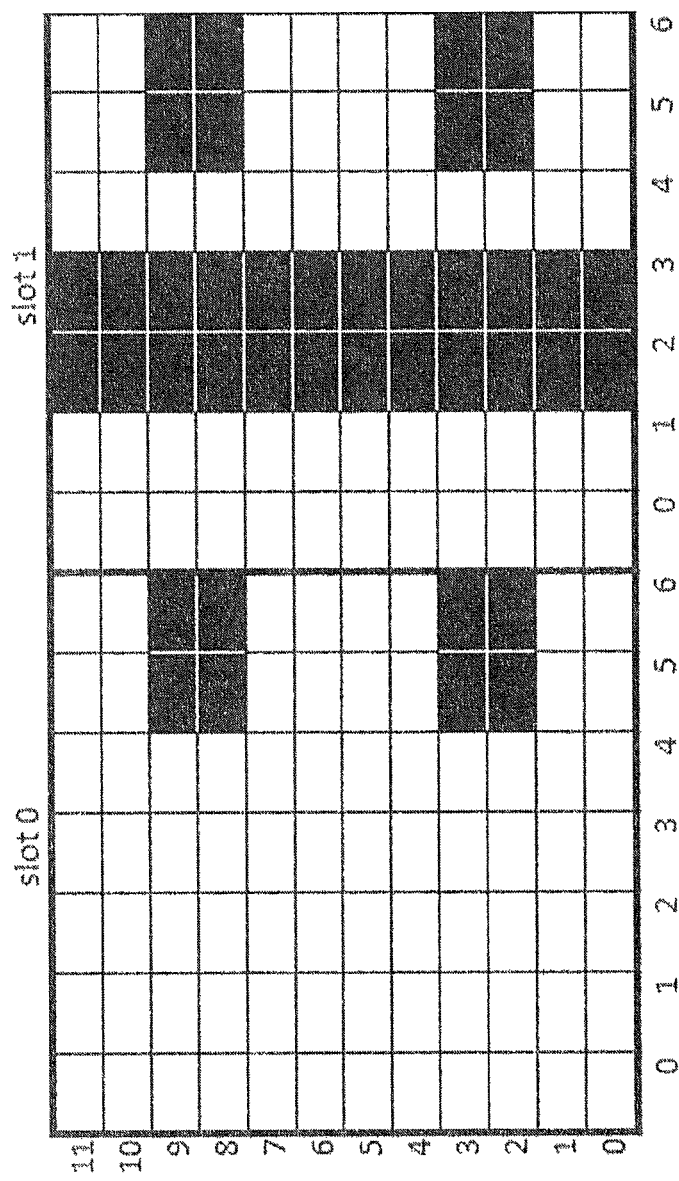
FIG. 1 depicts an example of REs configurable for CSI-RS transmission in one PRB.

There are certain sub-frames that can be configured for CSI-RS transmission. The standard allows re-occurring transmissions of CSI-RS with configurable periods between 5 ms and 80 ms and with an arbitrary sub-frame offset. 40 resource elements (REs), for example, can be allocated to CSI-RS in one CSI-RS sub-frame, which consists of two physical resource blocks (PRBs). These REs are shown in black color in the example in FIG. 1, which depicts REs configurable for CSI-RS transmission in one PRB pair where the horizontal axis represents OFDM symbols and the vertical axis represents sub-carrier number. The whole grid depicted in FIG. 1 illustrates the REs available in two PRBs belonging to one CSI-RS sub-frame, where the black REs are those that can be configured for CSI-RS transmission. The pattern depicted in FIG. 1 is repeated over the entire system bandwidth. If no CSI-RS is transmitted on these REs, then they are typically used for physical downlink shared channel (PDSCH) transmission. The CSI-RS transmission spans the entire system bandwidth. The pattern of the REs for one PRB is configured by radio resource control (RRC) signaling and then applied to all PRBs in that sub-frame. For a typical system bandwidth of 20 MHz, for example, there are 100 PRBs that all transmit the same CSI-RS signal on the same REs within the PRBs. For example, one unique CSI-RS resource configuration may support 1, 2, 4 or 8 antenna ports, occupying 2, 2, 4 or 8 REs.

There are 3 different types of CSI-RS configurations in R11:

A non-zero power CSI-RS resource configuration, which is defined in the information element (IE) CSI-RS-ConfigNZP. On the REs allocated for this transmission, the UE measures the signal power and estimates the channel in other ways in order to compute the full CSI. The UE can be setup to measure up to 3 different non-zero power configurations, which are transmitted on 3 different, typically non-overlapping, sets of REs. Depending on the number of antenna ports used, each resource configuration needs between 2 and 8 different REs out of the 40 available.

A CSI-RS resource configuration for interference measurement, which is defined in the IE CSI-IM-Config. The REs defined in this configuration shall be used by the UE to measure interference. Typically, the serving cell of the UE would be muted on these REs and one or several neighbour cells would transmit. The number of REs that can be defined in one individual CSI-IM configuration is between 4 and 40 (all of them), with a granularity of 4 REs. A UE can be setup with 3 individual CSI-IM resource configurations.

A zero power CSI-RS configuration, which is defined in the IE ConfigZP. The REs are configured in the same way as the CSI-IM, but not explicitly used by the UE for interference estimations. There are 4 individual zero power CSI-RS resource configurations.

Based on the types of the CSI-RS configurations, a CSI process can then be defined in which the UE is told how to provide feedback about the channel state to the network. Within such a CSI process, one resource configuration for non-zero power CSI-RS and one resource configuration for CSI-IM is defined. A UE can be configured with up to 4 different CSI processes.

When R11 is used, a channel quality indicator (CQI) is reported by the UEs. This is suitable for link adaptation. For cell discovery, however, it would be better to report reference signal received power (RSRP) and/or reference signal received quality (RSRQ) values instead or in addition to CQI. In addition, only 3 non-zero power and 3 interference measurement configurations can be setup per UE with RRC signaling. As a result, only 3 cells can be discovered during one sub-frame. If more than 3 cells are to be discovered, then the network needs to use RRC reconfigurations to set-up new resource configurations at the UE, which would result in signaling overhead and would not help achieving simultaneous discovery of cells in an efficient manner. Since the CSI-RS is transmitted over the entire bandwidth, in most cases, an unnecessarily large number of REs are used for the discovery signal of one cell. If the CSI-RS is transmitted on fewer REs, the freed resources could be used by other cells and, hence, more cells could be discovered during one sub-frame.

Since the PDSCH transmission to legacy R8/R9 UEs is not defined in R11, using CSI-RS as in R11 for cell discovery either limits the throughput to those UEs or has degraded performance due to PDSCH interference. Specifically, there is no CSI-RS in R8 and R9 and only UEs under R10 and R11 would understand the presence of CSI-RS, where the CSI-RS are transmitted on REs that usually are intended for PDSCH transmission. If a PDSCH transmission is scheduled to an UE under R10/11 on a CSI-RS sub-frame, then the PDSCH is not transmitted on CSI-RS REs. If, on the other hand, a PDSCH transmission is scheduled to an UE under R8/9, the standard does not specify whether the PDSCH on the CSI-RS REs shall be transmitted or not.

Figure 2:
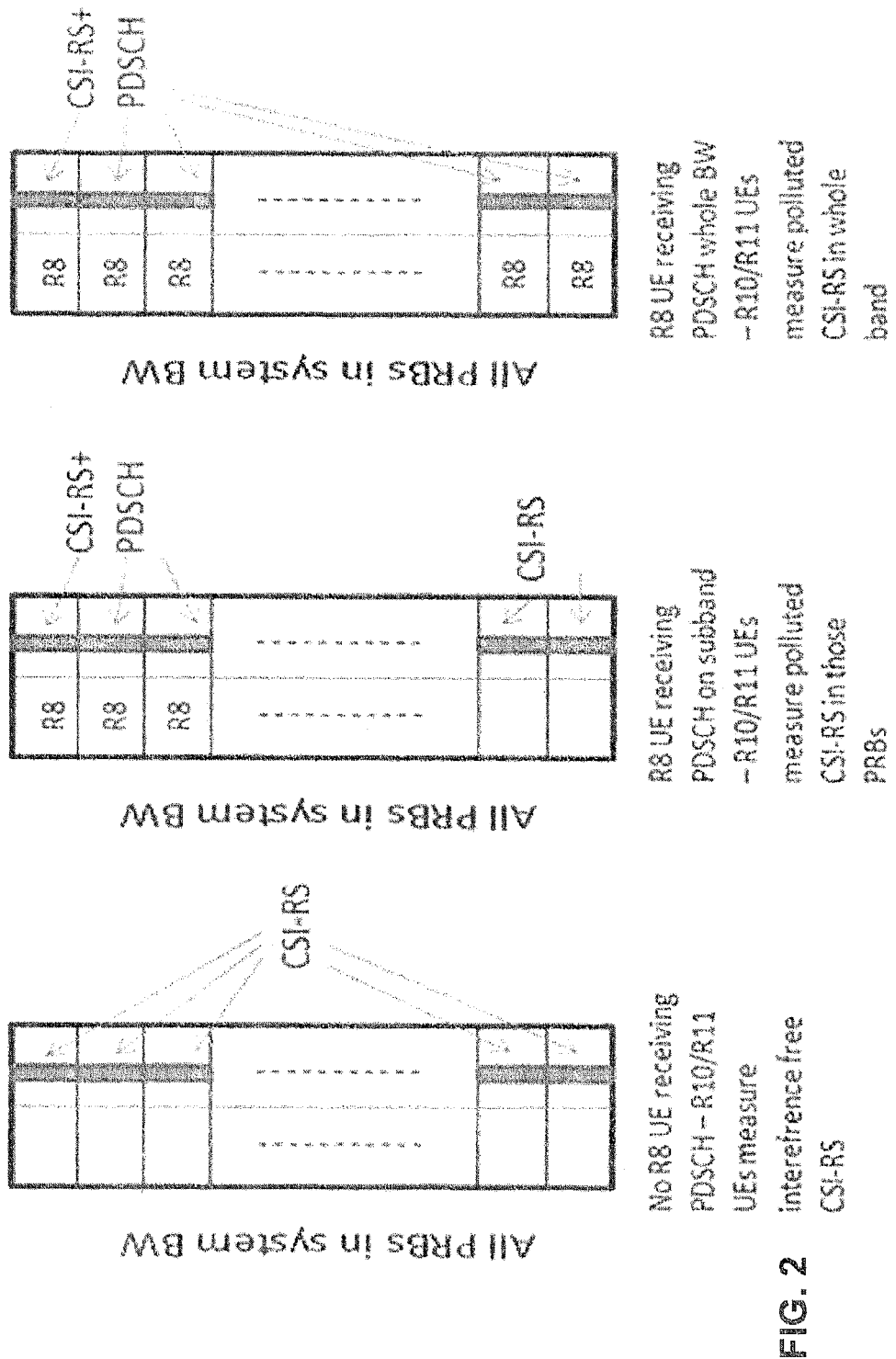
FIG. 2 depicts an example of interference on CSI-RS due to PDSCH transmission to legacy UEs.

UEs under R10/R11 can measure CSI-RS in a sub-frame but at the same time, the reference signal may be interfered with by a PDSCH transmission to legacy UEs. A R8 or R9 UE could be scheduled during a CSI-RS sub-frame, either only over a sub-band/sub-frame or over the entire system bandwidth as illustrated in the example in FIG. 2, which depicts interference on CSI-RS due to PDSCH transmission to legacy UEs. If PDSCH is transmitted on top of CSI-RS, it will have two negative impacts on the performance: 1) the CSI-RS measurement is corrupted by interference and 2) the PDSCH transmission is interfered with. A second option would be to simply not transmit any PDSCH to legacy UEs on the CSI-RS REs, which would result in approximately 34% of a CSI-RS sub-frame not being used in the worst case. As shown on the left-hand side of FIG. 2, none of the R8 UEs receives PDSCH during the CSI-RS transmission. Thus, no interference occurs when R10/R11 UEs measure the CSI-RS. In the center of FIG. 2, R8 UEs and R10/11 UEs are scheduled simultaneously but on different sub-carriers. The R8 UEs receive PDSCH, which is transmitted on top of the CSI-RS. The R10/R11 UEs measure the CSI-RS over the entire system bandwidth. On those REs where a PDSCH is transmitted, their CSI-RS measurements may be corrupted. On the right-hand side of FIG. 2, R8 UEs are scheduled over the entire system bandwidth. Thus, all CSI-RS measurements will be interfered.

To obtain better performance in the CSI-RS measurement, PDSCH transmission to UEs under R8/R9 on CSI-RS REs should be avoided. This is the case for the interference measurement resource and also for the non-zero power CSI-RS resources, which could impose negative limitations on the scheduler especially in the early deployments of HetNets when still many legacy UEs are in usage.

The proposed approach comtemplates systems and methods that are configured to discover as many cells as possible within one CSI-RS sub-frame while maintaining certain detection and measurement performance. The proposed approach is configured to unambiguously identify at least the number of anticipated small cells within one cluster (e.g. 10) and to further identify all small cells within the coverage area of a base station/macro cell. If a discovery signal (DS) allows one to distinguish between the cells, then a one-to-one mapping between the discovery signal of the cells and a physical cell index (PCI) can be established. The impact of small cell discovery on the scheduling of PDSCH to legacy UEs is as little as possible. The proposed approach is further configured to transmit PDSCH to UE under R8/R9 on all CSI-RS REs on sub-bands.

Figure 3:
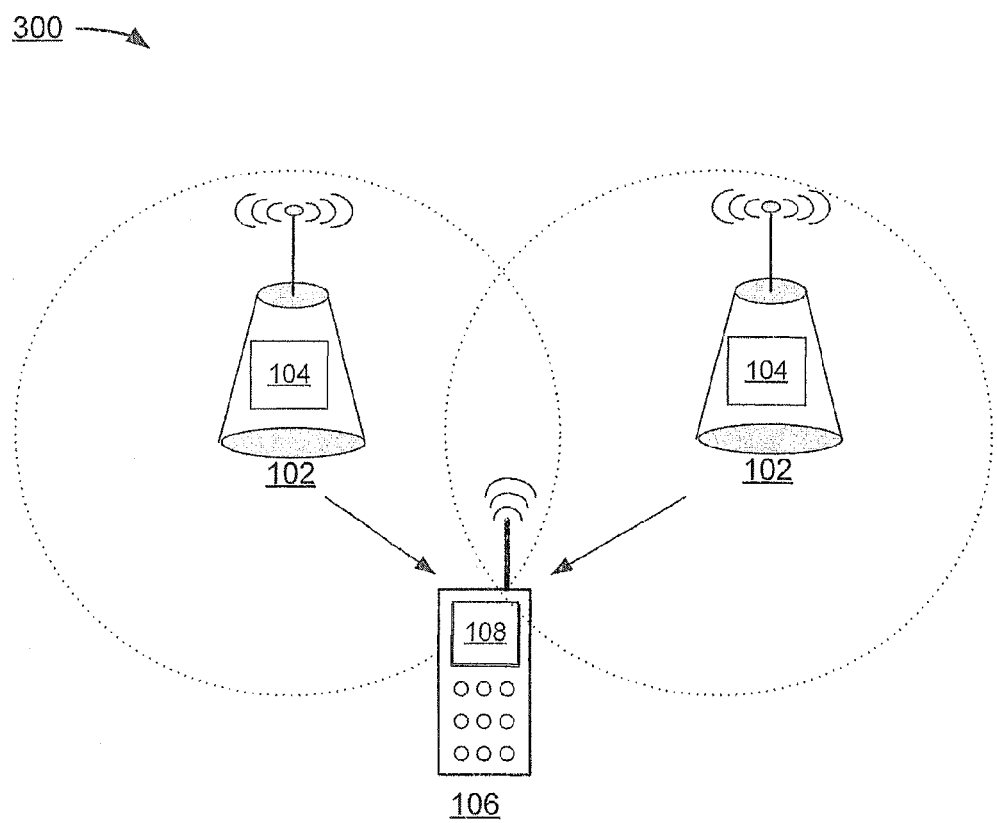
FIG. 3 depicts an example of a system to support modified reference signal transmission for cell discovery in a mobile communication network in accordance with one or more embodiments of the invention.

FIG. 3 depicts an example of a system 300 to support modified reference signal transmission for cell discovery in a mobile communication network. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 3, system 300 includes a plurality of base stations (also referred to herein as "cells" or "transmission points") 102s, each having a reference signal modification unit 104 and one or more mobile or user equipment (UEs) 106 connect to the base stations 102 within the coverage of the base stations 102, wherein the UE 106 includes an discovery signal (DS) unit 108. Although CSI-RS is used as a non-limiting example in the discussions below, the approaches discussed below also apply to other discovery or reference signals (RS) such as PRS. As referred to hereinafter, each base station 102 can be but is not limited to a macro base station, a high transmit power base station, a low-power node, or any other types of the base station operable to transmit cell identities to the UE 106 in a multi-layered network for identification and connection. Each UE 106 can be but is not limited to one of a mobile computing, storage, or communication device, such as a laptop PC, a tablet PC, an iPod, an iPhone, an iPad, a Google Android device, a portable storage device, or a cell phone.

As referred to hereinafter, the terms "unit" includes hardware, firmware, or software and corresponding processor(s) for executing the software, or any combination of one or more of these components used to effectuate a purpose. As a non-limiting example, the software instructions are stored in non-volatile memory (also referred to as secondary memory). When the software instructions are executed, at least a subset of the software instructions is loaded into memory (also referred to as primary memory) by a computing unit. When the software instructions are executed, at least a subset of the software instructions is loaded into memory, and the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits (ASIC) for performing the processes.

In the example of FIG. 3, the reference signal modification unit 104 of the each of the base stations/cells 102 is configured to modify a discovery signal or reference signal based on CSI-RS to represent the plurality of cells 102 and to maximize the number of the cells 102 represented during one sub-frame of the CSI-RS signal for transmission. For a non-limiting example, number of REs that are available for reference signal transmission during one sub-frame is NPRB*40, where NPRB is the number of PRB pairs available during one sub-frame. For simplicity, a system bandwidth of 20 MHz resulting in 100 PRBs pairs is assumed here as a non-limiting example (other system bandwidths are supported as well). As a result, 4000 REs are available for small cell discovery. As the standard is defined now, at least 2 REs have to be used for one CSI-RS configuration, but two cells 102 can transmit in a code multiplexed fashion on the same two REs. Currently, an unnecessary number of REs are used to represent one cell to be discovered: 2 REs per PRB pairs and 100 PRB pairs in a 20 MHZ band result in 200 REs being used for the discovery signal of one cell 102. Simulations have shown that it is more reasonable to assume that between 8 and 16 REs are sufficient for reliable cell discovery. In some embodiments, the reference signal modification unit 104 is configured to calculate/simulate the number of REs of CSI-RS one cell 102 needs to transmit based on given requirements on, for instance, detection probability. In some embodiments, instead of maximizing the number of the cells 102 represented in the CSI-RS, the reference signal modification unit 104 is configured to keep the number of the cells represented in the modified RS constant while reducing the number REs to be utilized to a minimum, which minimizes interference with R8 UEs on PDSCH transmission.

In some embodiments, the reference signal modification unit 104 is configured to change the smallest granularity of number of the REs allocated within one PRB in the modified CSI-RS from 2 REs to 1 RE, which offers more flexibility for the RE allocation within one PRB. In another embodiment, the reference signal modification unit 104 is configured to keep the smallest granularity unchanged as it is now defined in the standard. In some embodiments, the number of REs within one PRB that are used for one cell is configurable. Additionally, the number of base stations/cells 102 that can send CSI-RS signals within one sub-frame is also configurable. One extreme case would be that the reference signal modification unit 104 of one cell 102 utilizes all 40 REs and another extreme case would be that the CSI-RS units 104 of 40 cells 102 use one RE each. In some embodiments, the reference signal modification unit 104 can also choose to use a smaller number of PRBs to transmit the CSI-RS for one CSI-RS configuration instead of using all PRBs in the R11 LTE standard, where the chosen PRBs do not need to be consecutive.

The final number of REs that are needed to reliably discover a cell 102 may vary depending on the radio conditions in the deployment. In some scenarios, only a few REs might be needed whereas in other scenarios many REs are needed to discover the cell 102. It would be a waste of resources to always transmit the same CSI-RS representing one single cell on the same REs over all PRBs in the entire system bandwidth. In some embodiments, the reference signal modification unit 104 is configured to provide a flexible "cell-to-CSI-RS resources (RE/pRB)" mapping between the discovery signal of the cells 102 and a physical cell index (PCI) so that the smallest required number of REs/PRBs per cell can be utilized and the maximum number of the cells 102 can be represented and discovered in one sub-frame. The performance between discoveries based on 40 REs in a single PRB pair and discoveries based on 40 REs spread out on 100 PRB pairs might be different due to frequency diversity in the latter case.

In some embodiments, the maximum number of available PRBs is variable based on the available bandwidth since the LTE system can be deployed with different system bandwidths. The flexible configuration approach by the reference signal modification unit 104 takes this into account for allocations of the REs. For a non-limiting example, assume that 20 REs are needed to discovery a cell 102. In a 20 MHz system, it is possible to assign one RE in a PRB and then to use 20 PRBs in the frequency domain. But in a 3 MHz system, the number of available PRBs in the frequency domain is smaller. In that case it would be better to use more REs for the cell 102 within one PRB pair and then to have fewer PRB pairs in the frequency domain. In one exemplary scenario of 100 available PRBs, the number of REs required can be described by the formula below:

$$N_{Dect} = K_{PRBpair} \cdot RE_{PRBpair}, \text{ with } K_{PRBpair} \in \{1, 100\}, RE_{PRBpair} \in \{1, 40\}$$

where $N_{Dect}$ is the number of required REs to discover one cell, $RE_{PRBpair}$ is the number of REs in one PRB pair that is used to represent one cell 102, and $K_{PRBpair}$ is the number of PRBs used in the frequency domain to represent the CSI-RS for the cell 102. In the current R11-LTE standard, only $RE_{PRBpair}$ is configurable between 1 and 8 and $K_{PRBpair}$ is always equal to 100 (for a 20 MHz system bandwidth). As a result, too many REs are wasted for one cell in most cases and too few REs might be available in a few cases.

For another non-limiting example, assuming that 100 PRB pairs and 4000 REs are available and 20 REs shall be used to discover one cell 102 (for this example it is not discussed whether these REs shall be allocated spread out in the frequency domain or within a single PRB), then 4000/20=200 unique cells can be discovered with a proper RE allocation. The RE allocation for this example can be performed in different ways. One extreme case is to use 20 REs in one PRB pair for one cell 102 and the remaining 20 REs for another cell 102, where every PRB pair represents two new cells. Another extreme case is that each of the 40 REs in one PRB represents one cell 102, where 20 PRBs are needed in the frequency domain to represent the cell 102.

In some embodiments, the reference signal modification unit 104 is configured to support frequency domain multiplexing of the CSI-RS for different cells so that a single base station 102 or eNB should not transmit CSI-RS over the entire system bandwidth but only on defined PRBs. In some embodiments, a new discovery process, e.g. a discovery signal (DS) process should be introduced similar to the CSI process defined in the standard. Transmitting the reference signal in a frequency multiplexed fashion to enhance the cell discovery involves novel techniques on both the network side and the UE side. On the network side, the reference signal modification unit 104 is configured to modify and transmit the signal and to evaluate the reports received from the UEs 106. On the UE side, the DS unit 108 of the UE 106 is configured to understand the new configurations of the reference signal and to perform measurements and reporting.

In some embodiments, the reference signal modification unit 104 is configured to specify one or more of starting PRB, frequency jump to the next PRB, and the number of total PRBs in the modified CSI-RS. In another embodiment, a PRB offset, $\Delta_{PRB}$, towards the lowest PRB (typically 0) could be defined. The transmission of the modified CSI-RS signal would then span the entire system bandwidth on the PRBs equal to $k^*\Delta_{PRB}$, where k is a natural number and for all k the product $k^*\Delta_{PRB}$ shall point to an available PRB with the system bandwidth (i.e. $k^*\Delta_{PRB}$ shall be less or equal to 100 for the 20 MHZ system bandwidth). For transmission, no end PRBs need to be specified since a transmission over the entire bandwidth is assumed.

Under the approach described above, certain PRBs can be excluded by the reference signal modification unit 104 from the CSI-RS based signal strength and quality calculation and they can be used for interference free PDSCH transmission to legacy UEs. For a non-limiting examples, when only 20 cells need to be discovered, 20 REs per cell are enough. As a result, CSI-RS could be transmitted just on 10 PRB pairs and the remaining 90 PRB pairs are left unused for CSI-RS transmission.

Figure 4:
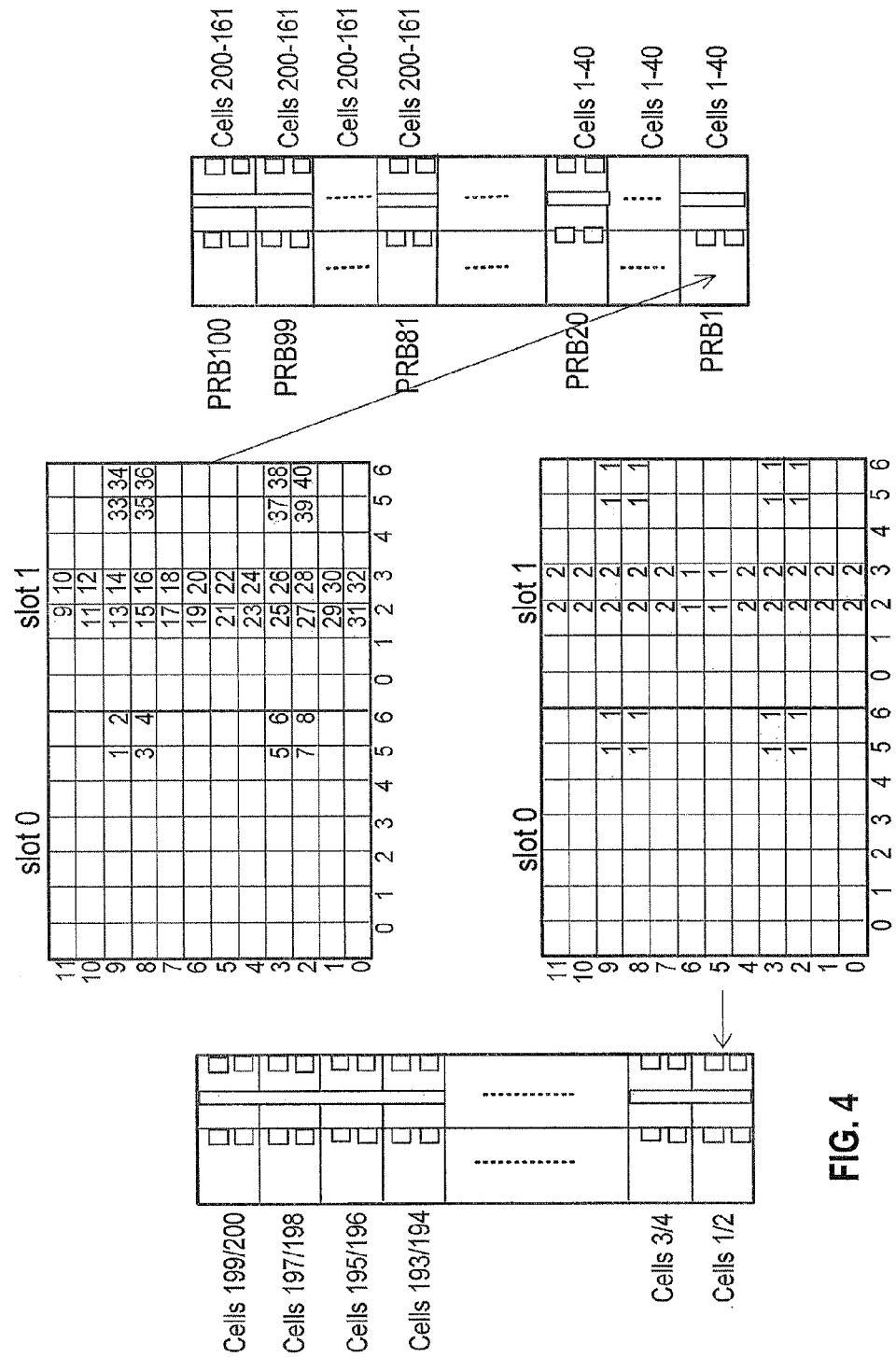
FIG. 4 depicts two examples of configurations for modified CSI-RS discovery signal transmission in accordance with one or more embodiments of the invention.

FIG. 4 depicts two examples of configurations for modified CSI-RS discovery signal transmission. On the left-hand side of FIG. 4, 20 REs are used for one cell in one PRB pair. Thus, the discovery signal (DS) of two cells is sent for every new PRB pair. On the right-hand side of FIG. 4, 40 REs are used for different cells in each PRB pair. Thus, 20 PRB pairs are needed to send the DS for one cell. Note that the PRBs used for one cell do not need to be consecutive. For a non-limiting example, a resource configuration where cells 1-10 are transmitted on PRBs 1, 3, 5, 7, 9 and cells 11-20 are transmitted on PRBs 2, 4, 6, 8, 10 can be set up. In addition, a cell 102 is not transmitting over the entire system bandwidth but only over a part of it. Other cells 102 may transmit the same CSI-RS on different sub-carriers.

In the example of FIG. 3, the DS unit 108 of the UE 106 is configured to discover the cells 102 included in the modified CSI-RS transmitted. First, the DS unit 108 is configured to receive a DS process ID with the modified CSI-RS signal and to configure the REs within a sub-frame which are used for CSI-RS. Based on the specified number of cells that are transmitted using the configured REs, the DS unit 108 is then configured to derive which cells 102 are transmitted on what REs. This information could for instance be taken from a standardized table that is mapping the REs to the different cells 102. For a non-limiting example, if 20 REs and 4 cells are configured, the DS unit 108 would then derive a certain mapping of the REs to the cells, e.g. REs 1-5 for cell 1, REs 6-10 for cell 2, etc.

In some embodiments, the DS unit 108 of the UE 106 is configured to measure the strength and/or quality of the modified CSI-RS and report the measurements to the serving cell 102. In some embodiments, the DS unit 108 of the UE 106 is configured to measure strength and quality of the modified CSI-RS received for the configured cells and to report the N strongest. The reference signal modification unit 104 of the serving base station/cell 102 can then establish a table that maps the strength and quality of the modified CSI-RS received to the different cells. In some embodiments, the table does not need to be standardized. In one embodiment, the serving cell 102 obtains this table from the central CSI-RS discovery signal configuration point somewhere in the network.

Figure 5:
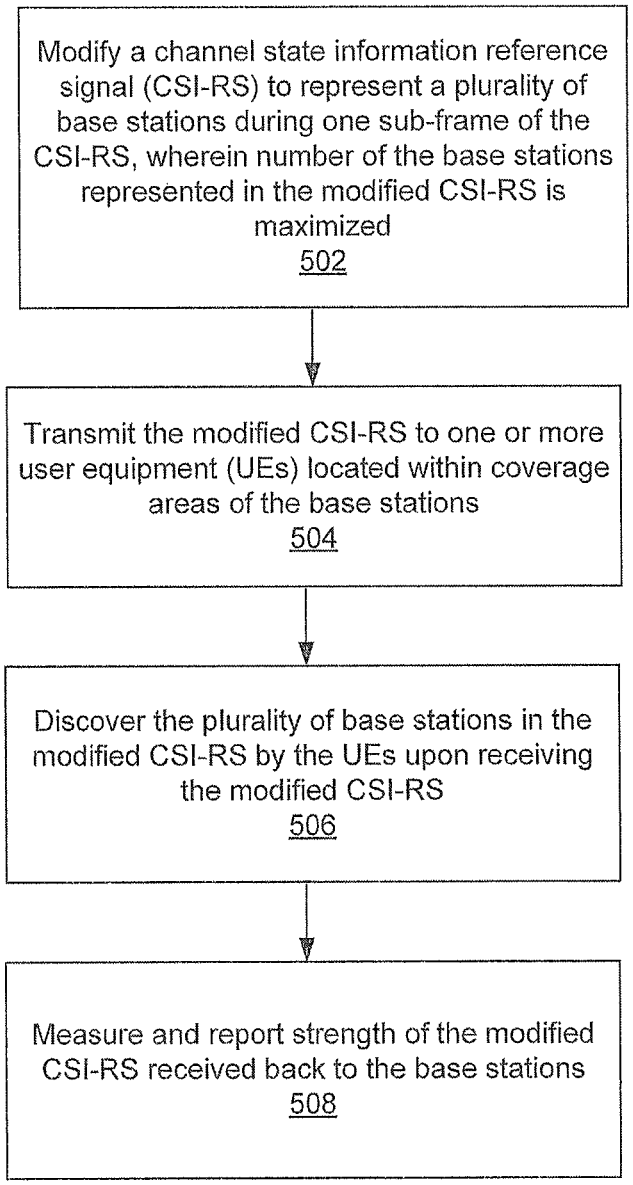
FIG. 5 depicts a flowchart of an example of a process to support modified reference signal transmission for cell discovery in a mobile communication network in accordance with one or more embodiments of the invention.

FIG. 5 depicts a flowchart 500 of an example of a process to support modified reference signal transmission for cell discovery in a mobile communication network. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where a channel state information reference signal (CSI-RS) is modified to represent a plurality of cells/base stations/transmission points during one sub-frame of the CSI-RS, wherein number of the cells represented in the modified CSI-RS is maximized. The flowchart 500 continues to block 504, where the modified CSI-RS is transmitted to one or more user equipment (UEs) located within coverage areas of the base stations. The flowchart 500 continues at block 506, where the cells in the modified CSI-RS are discovered by the UEs upon receiving the modified CSI-RS. The flowchart 500 ends at block 508, where strength of the modified CSI-RS received is measured and reported back to the base stations.

While one or more embodiments of the invention have been described above, it should be understood that they have been presented by way of example only, and not by way of limitation. Likewise, the various figures or diagrams may depict an example that is architectural or another configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

One or more of the functions described in this document may be performed by an appropriately configured module or unit. The term "module" or "unit" as used herein, can refer to hardware, firmware, software and any associated hardware that executes the software, and any combination of these elements for performing the associated functions described herein. Additionally, various modules and units can be discrete modules; however, as would be apparent to one of ordinary skill in the art, two or more modules may be combined to form a single module that performs the associated functions according various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and/or processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization required by the invention.

What is claimed is:

1. A system to support modified reference signal transmission for cell discovery in a mobile communication network, comprising:
    at least one first processor in each of a plurality of base stations, which in operation, is configured to:
        modify a reference signal (RS) to represent the plurality of base stations during one sub-frame of the RS, wherein number of the cells represented in the modified RS is maximized;
    transmit the modified RS to one or more user equipment (UEs) located within coverage areas of the base stations;
    at least one second processor in each of said UEs, which in operation, is configured to:
        discover the plurality of base stations in the modified RS upon receiving the modified RS;
        measure and report strength of the modified RS received back to the base stations,
    wherein the at least one first processor is further configured to support frequency domain multiplexing of the RS for different base stations so that a single base station transmits the RS only on defined physical resource blocks (PRBs), and to specify one or more of a starting PRB, a frequency jump to a next PRB, and a number of total PRBs in the modified RS.

2. The system of claim 1, wherein:
    the mobile communication network is an LTE network.

3. The system of claim 1, wherein:
    the RS is a channel state information reference signal (CSI-RS).

4. The system of claim 1, wherein:
each of the base stations is one of a macro base station, a high transmit power base station, a low transmit power node (LPN), and another base station operable to transmit its cell identity to one of the UEs in a multi-layered network for identification and connection.

5. The system of claim 1, wherein:
each of the UEs is a mobile device.

6. The system of claim 1, wherein:
the at least one first processor is configured to allocate a plurality of resource elements (REs) in one of a plurality of physical resource blocks (PRBs) in the sub-frame.

7. The system of claim 6, wherein:
the at least one first processor is configured to keep the number of the cells represented in the modified RS constant while reducing a number of REs to be utilized to a minimum.

8. The system of claim 6, wherein:
the at least one first processor is configured to change the smallest granularity of number of the REs allocated within one PRB in the modified RS.

9. The system of claim 6, wherein:
the at least one first processor is configured to utilize all of the REs in the PRB for one of the base stations.

10. The system of claim 6, wherein:
the at least one first processor is configured to utilize one of the REs in the PRB for each of the base stations.

11. The system of claim 6, wherein:
the at least one first processor is configured to provide a cell-to-RS resources mapping so that the smallest required number of REs and/or PRBs per base stations are utilized and the maximum number of the base stations are represented in the one sub-frame.

12. The system of claim 1, wherein:
the at least one first processor is configured to take into account the maximum number of available PRBs for allocation of the REs, which is variable based on the available bandwidth of the mobile communication network.

13. The system of claim 6, wherein:
the at least one second processor is configured to derive which of the base stations are transmitted on what REs based on the number of the base stations transmitted using the REs.

14. The system of claim 1, wherein:
the at least one first processor is configured to exclude certain PRBs from the RS based signal strength and quality calculation, wherein the excluded PRBs are used for interference free physical downlink shared channel (PDSCH) transmission to legacy UEs.

15. The system of claim 1, wherein:
the at least one second processor is configured to measure both strength and quality of the modified RS received and to report the N strongest.

16. The system of claim 15, wherein:
the at least one first processor is configured to establish a table that maps the strength and quality of the modified RS received to the base stations.

17. A method to support modified reference signal transmission for cell discovery in a mobile communication network, comprising:

modifying a reference signal (RS) to represent a plurality of base stations during one sub-frame of the RS, wherein number of the base stations represented in the modified RS is maximized;
transmitting the modified RS to one or more user equipment (UEs) located within coverage areas of the base stations;
discovering the plurality of base stations in the modified RS by the UEs upon receiving the modified RS;
measuring and reporting strength of the modified RS received back to the base stations;
supporting frequency domain multiplexing of the RS for different base stations so that a single base station transmits the RS only on defined physical resource blocks (PRBs); and
specifying one or more of a starting PRB, a frequency jump to the next PRB, and a number of total PRBs in the modified RS.

18. The method of claim 17, further comprising:
allocating a plurality of resource elements (REs) in one of a plurality of physical resource blocks (PRBs) in the sub-frame.

19. The method of claim 18, further comprising:
keeping the number of the cells represented in the modified RS constant while reducing the number REs to be utilized to a minimum.

20. The method of claim 18, further comprising:
changing the smallest granularity of number of the REs allocated within one PRB in the modified RS.

21. The method of claim 18, further comprising:
utilizing all of the REs in the PRB for one of the cells.

22. The method of claim 18, further comprising:
utilizing one of the REs in the PRB for each of the cells.

23. The method of claim 18, further comprising:
providing a cell-to-RS resources mapping so that the smallest required number of REs and/or PRBs per cell are utilized and the maximum number of the base stations are represented in the one sub-frame.

24. The method of claim 23, further comprising:
taking into account the maximum number of available PRBs for allocation of the REs, which is variable based on the available bandwidth of the mobile communication network.

25. The method of claim 18, further comprising:
deriving which of the base stations are transmitted on what REs based on the number of the base stations transmitted using the REs.

26. The method of claim 17, further comprising:
excluding certain PRBs from the RS based signal strength and quality calculation, wherein the excluded PRBs are used for interference free physical downlink shared channel (PDSCH) transmission to legacy UEs.

27. The method of claim 17, further comprising:
measuring both strength and quality of the modified RS received and reporting the N strongest.

28. The method of claim 27, further comprising:
establishing a table that maps the strength and quality of the modified RS received to the base stations.

* * * * *